United States Patent
Potter et al.

(10) Patent No.: US 6,177,014 B1
(45) Date of Patent: Jan. 23, 2001

(54) CESIUM FORMATE DRILLING FLUID RECOVERY PROCESS

(76) Inventors: J. Leon Potter; Gart L. Hensley, both of P.O. Box 2965, Houston, TX (US) 77252

( * ) Notice: Under 35 U.S.C. 154(b), the term of this patent shall be extended for 0 days.

(21) Appl. No.: 09/187,239

(22) Filed: Nov. 6, 1998

(51) Int. Cl.[7] .............................. B01D 61/58; B01D 61/14
(52) U.S. Cl. ......................... 210/651; 210/772; 210/805; 210/806; 210/787
(58) Field of Search .................................... 166/265, 267; 175/66, 206; 210/650, 651, 805, 806, 779, 321.78, 321.87, 497.01, 772, 787

(56) References Cited

U.S. PATENT DOCUMENTS

| | | | |
|---|---|---|---|
| 4,436,635 | * | 3/1984 | Abrams et al. ....................... 210/806 |
| 4,482,459 | * | 11/1984 | Shiver ................... 210/639 |
| 4,846,973 | * | 7/1989 | Barnard ............................. 210/323.2 |
| 4,888,114 | * | 12/1989 | Gaddis et al. .................. 210/500.25 |
| 4,909,950 | * | 3/1990 | Katoh et al. .......................... 210/788 |
| 5,620,947 | * | 4/1997 | Elward-Berry ........................ 507/229 |
| 5,882,524 | * | 3/1999 | Storey et al. ......................... 210/712 |

* cited by examiner

Primary Examiner—W. L. Walker
Assistant Examiner—Richard W. Ward
(74) Attorney, Agent, or Firm—Arnold & Associates (57) ABSTRACT

This disclosure sets out a method and apparatus for recovery of cesium formate in water solution after use in a drilling process where trash and other debris accumulate in the drilling fluid. It incorporates a first stage centrifuge, a second stage centrifuge and a membrane separator serially connected, and incorporates a feedback loop. A feedback loop iteratively redirects solids and heavy weight concentrate after processing and recycles it to enhance recovery by enhanced removal of cuttings and trash in the stream. In addition, cuttings and other solids removed from the fluid stream are introduced into a wash tank, mixed with water, and the cuttings are further processed to remove remnants of the cesium formate. These recovered cesium formate remnants are passed through an evaporator to regain the density loss attributable to the dilutive wash water. The cuttings can then be thrown away without throwing away the valuable cesium formate in the drilling solution.

4 Claims, 6 Drawing Sheets

PLAN VIEW
FIG. 3

ELEVATION VIEW
FIG. 2

CESIUM FORMATE DRILLING FLUID RECOVERY PROCESS

BACKGROUND OF THE DISCLOSURE

The present disclosure is directed to a method of recovery and the related apparatus for use in recovery of drilling, drill-in and completion fluids used in exploration for hydrocarbons. More specifically, this is concerned with recovery of expensive drilling, drill-in and completion fluids, and especially those which utilize cesium formate as the base fluid. Before discussing that particular fluid, the context of drilling, drill-in and completion fluids use (definitions given below) and recovery should be set forth. Within this document, cesium formate base fluid used in the exploration for hydrocarbons will be often referred to as "drilling fluid".

While it is possible to drill for oil and gas formations using air as drilling fluid, the most common process involves drilling with drilling mud. Drilling mud is routinely a mixture of water and barite. Various and sundry clay constituents may be added to impart added weight to the water, and to provide the desired slickness or wetness. In addition, the drilling fluids used in this process often recover and carry a stream of ground particles. These result from the drilling process and are brought to the surface by the drilling mud. The recovery process typically involves taking heavy particles out of the fluid. This often involves the use of sand removing devices such as shale shakers, desanders and the like. The term "drilling mud" refers to traditional barite muds and the common or traditional muds. The term "drill-in fluids" refers to those fluids which are commonly used while drilling in the projected hydrocarbons production zone. The "completion fluids" are employed in the final stages to remove solids deposited and/or remaining in the wellbore prior to initial production.

A more advanced drilling fluid uses the same ingredients along with oil. Oil is the preferred solvent in many wells, the oil having a value of only about $40 per barrel in 1998 prices. In effect, it resembles diesel oil and has approximately that value.

In some well situations, it is necessary to use synthetic oils. These are sometimes called palm oil. These have the form of lubricants which are more expensive, with prices approaching $300 per barrel. In that instance, a well may have as much as a million dollars worth of drilling fluids circulating in it. Recovery and reclamation of the palm oil (sometimes synthetic in nature) is enhanced by recovery of most of that drilling mud base.

In recent years, a number of conditions have been encountered which require an all together different drilling fluid. The most significantly advanced drilling fluid available today utilizes cesium formate as the base fluid. This fluid (represented in symbolic form CsF) has a value approaching $4,000 to $4,200 per barrel in 1998 prices. It is available in only limited quantity. It provides a drilling fluid which is extremely heavy. Definitions of fluid weight will be given below. In addition to that, it has drilling characteristics which are quite advantageous. Some of these advantages will be given below.

With the great benefit from CsF, and with the great cost, care must be taken to recover and recirculate that kind of drilling fluid. Otherwise, it can not be afforded in wells where its use is normally indicated. Moreover, CsF drilling fluid is manufactured and marketed in a limited quantity because of the difficulties of manufacture and the lack of feed stock for making CsF drilling fluid. Beyond that, the CsF drilling fluid must be treated with great care so that practically all of the CsF is recovered for subsequent use and reuse.

To provide some context to this CsF has an advantage in that it makes a heavier weight drilling fluid. Drilling fluid must have a weight above the base line value defined by water. Water has a weight of about 8 pounds per gallon. When specifying a particular drilling fluid weight, water is the base line or minimum value. The weight of the drilling fluid is extremely important to well control. Well control requires appropriate monitoring of the well and control of the mud weight conditions. Wells are drilled underbalanced to speed up drilling, or overbalanced to prevent fluid leakage into the well. An overbalance situation occurs when the drill bit enters a formation where high pressure is likely to be encountered.

The weight of the fluid in the well borehole is varied depending on the probabilities of drilling into a high pressure formations. The weight of the fluid is varied to take into account these and other factors. Another aspect of the drilling fluid is the manner in which the fluid reacts with the drilling process. When initially used at the start of a well borehole, it is desirable that the drilling fluid segregate into a mud cake by solvent flow to adjacent formations. Explaining, the mud cake is a deposit of the sediment in the drill fluid. In effect, it is the heavy components which form a tacky or adhesive layer against the sidewall. This enhances the isolation of the open hole, thereby restricting the flow of fluids into the adjacent formations. To accomplish this, some portion of the drilling fluid solvent must flow into the formations. It is the filtrate that flows into the formation while the sediment forms the mud cake. This desirable process is important in the initial and intermediate stages of the well borehole. It is especially not desirable when drilling into formations which are likely to start producing flowing hydrocarbons.

Wells are normally deviated from the vertical so that the well borehole entering into the formation penetrates the production formation for greater lengths. Ideally, the borehole is steered so that it follows the producing section of the formation. This takes the borehole through a greater distance in the pay zone. While the vertical hole will have a pay zone only equal to the height of the formation, the pay zone is increased tremendously by drilling along the formation between the top and bottom interfacial boundaries of the producing formation. When drilling in that region, different drilling techniques are also required. It is not enough to merely rotate the drill bit, relying on the weight of the drill string on the drill bit and the stiffness of several drill collars to maintain a true hole with appropriate weight at the same instance. When drilling horizontally, for instance, the weight of the drill string is on the side, and the weight on the bit is substantially nil unless the drill bit is pushed into the well borehole. Moreover, when the hole is deviated towards the horizontal, it then requires that the pipe snake around the corner, so to speak, and that creates great difficulties in applying torque to the pipe string from the rotary table. That is often dealt with by removing the conventional tri-cone drill bit and substituting a mud motor with a specialty drill bit or with a modified tri-cone bit which is somewhat reinforced to accommodate lateral loading. The drill bit is mounted on the mud motor, and well known or conventional steering equipment is used to control the deviation.

In this region, it is desirable to use the premium drilling fluids. In some wells, the quality of the well production is markedly enhanced by using the premium drill fluids. In the selected instances where CsF is used, it has a notable benefit to the production flow rate, and yet continues to maintain the positive well control which is achieved from overbalancing with respect to the formation. With the well fluid maintaining the localized pressure achieved by the column of drilling fluid above the formation sufficient to prevent the formation from flowing into the well borehole, this keeps production fluids from commingling with the drill fluids. If that were to occur, the column of drilling fluid might be reduced in density. This is known by the term "gas cut" which means that small bubbles of natural gas have been commingled in the drilling fluid. As bubbles migrate to the surface, they tend to foam with reduction in dynamic pressure. This can easily create a catastrophic blowout because the aggregate pressure at the bottom become less and less over time, and a run away condition may be encountered in which formation fluids flow freely into the well borehole. This is how blowouts start.

The best way to overcome a blowout is to control the weight of fluid so that the formation faces an overbalanced condition, i.e. bottom hole pressure of the column of fluid in the well borehole is preferably greater than the formation pressure that might be encountered. In deep wells, the formation pressures can be exceedingly high, thereby mandating the use of a heavier column of drilling fluid.

The CsF fluid of the present disclosure has a weight ranging as high as 19 pounds per gallon. That is one of the very heaviest fluids available. It is effective to maintain good control, desirable lubricity in the region of the drill bit, and does not interact in a negative sense with the formation. Such a fluid is relatively expensive, having a cost of about $4,000 per barrel in 1998 prices.

This expensive and highly desirable drilling fluid is used in a well and then must be recovered. After that, it is cleaned up and recycled for use. Present day techniques of cleaning up CsF drilling fluid recover perhaps 66%, and sometimes slightly more of the fluid. In effect, this would mean that a well requiring 1,000 barrels of drilling fluid would involve a capital expense of approximately $4 million for drilling fluid to finish the drilling process and would recover only about two thirds of that value. Even should the recovery be raised to 75%, meaning approximately $3 million worth of drilling fluid, that would still represent a significant cost. The loss is so great that the present disclosure sets forth a method and apparatus for cleaning up the drilling fluid and especially for recovering the expensive CsF.

The CsF recovered by the present process has the form of a water base dissolved salt. It runs the risk of picking up cuttings and other debris during drilling. There will be particles (ranging from the largest to the smallest) which are generated by the drilling process. In addition, there may be salt water from various artesian formations as well as oil, gas bubbles and the like. At the surface, it is necessary to remove all these materials from the heavy salt solution to recover it. By appropriate use of the present method and apparatus, the recovery can be increased significantly so that the percent loss is reduced from about a 30% loss to just a few percent loss depending on adjustments made to the equipment. By use of this procedure, the recovered fluid is clean and pure, and the portions which are discarded include a significantly reduced trace of the CsF in the discarded trash (mostly solids). The segregated trash and other cuttings can be discarded. Moreover, they can be discarded by return to an injection well, or it can be placed in any other waste disposal stream conventional in the oil field. The waste material removed from the CsF is primarily cuttings and includes very little of the CsF.

SUMMARY OF THE PRESENT APPARATUS

This apparatus is a three component system. One component of significance is the incorporation, use and repetitive recycling of the recovered spent CsF through one or more wash tanks. Various cleaning steps are carried out in the tanks. The present apparatus contemplates a feedback loop involving a high speed centrifuge separator and decanting centrifuge connected with a permeable membrane. In the preferred embodiment, the permeable membrane takes the form of an elongate hollow pipe. It is structurally solid; i.e. it is able to contain fairly high pressures. The pipe is replicated so that several units of the pipe are arranged in parallel fashion within a closed housing. The flow is directed through the pipe. Because it is a permeable membrane, certain constituents of the flow weep through the sidewall. This accomplishes separation of the spent CsF fluid. By the continued operation of a recycling pump, the permeable membrane is connected in a feedback loop with one or more stages of centrifuge separators. Through the use of the foregoing equipment and by judicious separation, the process of the present disclosure cleans and purifies the drilling fluid, thereby achieving a higher recovery of the CsF and a better and more clear cut removal of the sediment. Not only is that accomplished, the present apparatus achieves this with a reduction in utility cost as will be detailed.

DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
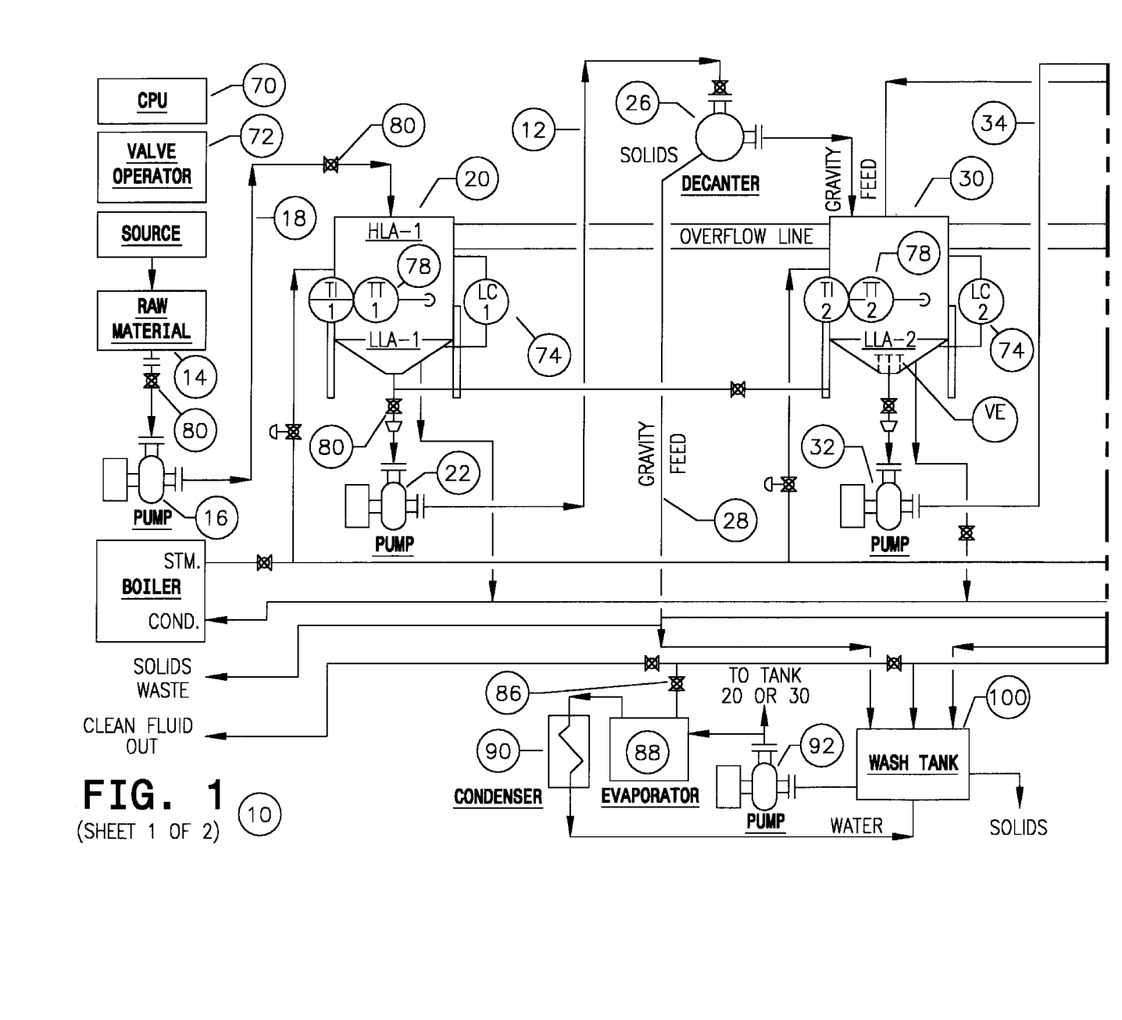
FIG. 1 is a schematic block diagram of an improved, portable reclamation plant to recover the cesium formate from the spent drilling fluid in accordance with the teachings of present disclosure incorporating a membrane separator operating with multiple stage centrifuges and incorporating a feedback flow path.

Attention is directed to FIG. 1 of the drawing where the numeral 10 identifies the present apparatus. It is connected to a cesium formate fluid well which delivers a flow of fluid to a tank 14. The tank 14 receives and stores a well fluid stream with the CsF mixed with a variety of fluids and cuttings from the well. Effectively, it is also a surge pond. Ideally, the dwell time in the tank is relatively short. It may be desirable to insulate the tank so that fluid heat loss does not occur. The tank is connected through an output valve and then to a pump 16. The pump 16 delivers CsF through a feed line 18 into a tank 20. The line 18 will be described as the input line while the line 12 is the outlet line. The tank 20 output is connected with a pump 22 which delivers the CsF for cleaning by a decanter centrifuge 26 which removes and disposes of solids in a pipe 28. The decanter 26 centrate output is transferred to a tank 30 and a pump 32 removes the tank flow via a feed line 34 into a second centrifuge 36 (a disc type centrifuge) which in turn, removes more solids via the pipe 38. The liquid discharge is input to a tank 40 drained by a pump 42.

The pump 42 delivers the flow of liquid (now partially clarified by removing solids at two centrifuges) to a pump 44 connected to a membrane separator 50. The pump 44 inputs the fluid flow through the separator 50 which outputs the permeate on a line 46 and delivers a feedback flow in the line 48. The feedback flow in the line 48 is returned preferably into one of the tanks 20, 30, or 40 where the tank 30 is preferred for reasons to be explained.

MULTIPLE STAGE SOLID REMOVAL

As described to this point, the system flows the input CsF through the tanks 20, 30, or 40 preliminary to treatment in the decanter centrifuge 26, treatment in the disc centrifuge 36, and treatment in the membrane separator 50. Solids are removed through the lines 28 and 38 for subsequent reprocessing as will be explained. In addition, solids are removed by the membrane separator 50 and are recycled through the feedback line 48. As noted, the feedback line could be input back at the tank 20, but it is probably more expedient to input it to the tank 30. Recycling of the solids has an advantage as will be noted. As described to this juncture, the input line of the CsF from the tank 14 results in an output of clean fluid through the line 46. Without the feedback loop 48, the recovery is less than acceptable, comprising perhaps 60%–70% of the CsF input to the system 10. A significant enhancement occurs through use of the feedback loop 48 in conjunction with the washing of the solids outputs from the decanter centrifuge 26 and disc centrifuge 36.

Looking now at the materials removed, they primarily constitute solids which are discharged through the pipes 28 and 38. These solids are taken through a wash cycle to be described. The solids discharged by the separator 50 are recycled. The solids discharged by the membrane separator 50 tend to carry a light film or coating of water on them, and that results in some (at least a trace) of the CsF which coats the solid particles. To that end, it is returned for reprocessing by the feedback line 48. The feedback line 48 delivers these solids back into the process for recycling again and again. By appropriate adjustment of the flow rates through the centrifuge 26, the second centrifuge 36 and the separator 50, an optimum can be achieved. In part however this depends on the mix of solids and the particular types of solids. It also depends on the propensity of the CsF in solution to coat the solids.

Accordingly, the system as described to this juncture achieves a significant recovery of the CsF, and that can be as high as about 70%, perhaps even 80%. More will be recovered through the wash cycle to be described below. Before getting to that, it is appropriate to consider operation of the membrane separator 50.

OVERVIEW OF THE MEMBRANE SEPARATOR AND DISC CENTRIFUGE FEEDBACK SYSTEM

Focusing solely on FIG. 1, the system incorporates a method of processing which delivers the feed to the tank 20 and then 30 and then tank 40. The CsF feed is input to the tanks 20, 30 and 40 under pressure by the lines which are connected to fill the tanks. All tanks are similar in that they are equipped with level controllers. All tanks are also preferably heated to control CsF temperature. Conveniently, heat can be provided with a heat exchanger or they can also be designed with a steam-heated jacket which is connected to a suitable source of steam. Optionally, each tank is equipped with a recirculation line from the pump back into the tank to continue circulating the CsF in the tank.

The membrane separator 50 flows the CsF through an elongate tubular membrane. In the preferred form, the membrane is provided with pores through the wall of the membrane. It is preferably made of sintered stainless steel particles which are compacted into a unitary wall to define the thickness of the wall. It resembles a pipe which has a wall thickness of about one quarter inch or so. The CsF is pumped through the interior of the pipe to flow at a specified velocity. Examples are given below. The sintered particles define a plurality of small pores which remove the solvent through the wall. The solvent (water in this instance) flows through the small pores. The pores are micron size and for this system, they are preferably submicron, preferably about 0.1 micron. Collectively, the pores are formed with a specified or mean pore diameter. The pore diameter can be specified to 100 microns, 10 microns, 1 micron, and even smaller as desired. The pore diameter is selected so that the pores will pass the solvent. This means that the water molecule is sufficiently small that it can flow through the pores. The molecules of the other materials in the fluid flow are larger and sufficiently large that they do not readily pass through the pores. Generally, solutions involving molecules that are sufficiently small will pass through the pores. Solids or particles and molecules above a certain size will not pass through the pores in the membrane.

The membrane separator is constructed and arranged so that the pores reject large molecules and particles. For instance, sand and shale particles are so large that they will not pass through the pores. The membrane separator takes advantage of this. As the CsF flows through the membrane separator having the porous wall tube (details are set forth below), the water weeps through the wall and collects on the outside of the membrane tube. It is then easily removed. This increases the concentration of the CsF flowing through the wall of the membrane tube.

The membrane concentrate discharge is the feedback delivered to the tank 30. It is ultimately input under pressure by the pump to the disc centrifuge 36. The disc centrifuge separates the concentrated CsF stream into two streams. Just as the membrane separator provided solvent separation, the centrifuge also provides a similar separation. Without being categorical about the matter, the centrifuge 36 makes a separation based on weight which in this specific instance assists in segregation of the trash components from the solvent. More specifically, the weight material in the stream is extracted and removed. Cuttings and solids are removed for subsequent disposal with a washing step to be detailed. By contrast, the membrane removes the water which is a relatively small and lightweight molecule. Since the liquor is a mix of components, some in solution, and some in suspension in the water, the membrane 50 removes water making a more highly concentrated CsF liquor which is then cycled again through the centrifuge 36 to remove the heavier components i.e. those that are separated by centrifugal forces. This takes out sand, shale and other solid pieces.

MEMBRANE EXTRACTION EQUIPMENT

To enhance an understanding of this system, particular emphasis is placed on the nature of the equipment and the different types of separations that are accomplished. The various types of separations accomplished here collectively provide an output stream of relatively pure solvent, or water. Again, other CsF solvents can be cleaned just as readily; if the solvent can be retrieved, then it can be recycled.

The description below focuses in part on the membrane separator 50. That will then be correlated to the centrifuge separators. For emphasis, the membrane separator will be discussed before the centrifuge separators so that the contrast between the two types of devices can be comprehended. More particularly, the membrane separator works the separation of the lightest molecules found in the CsF liquor. More noting the challenge is given below.

Figures 2, 3:
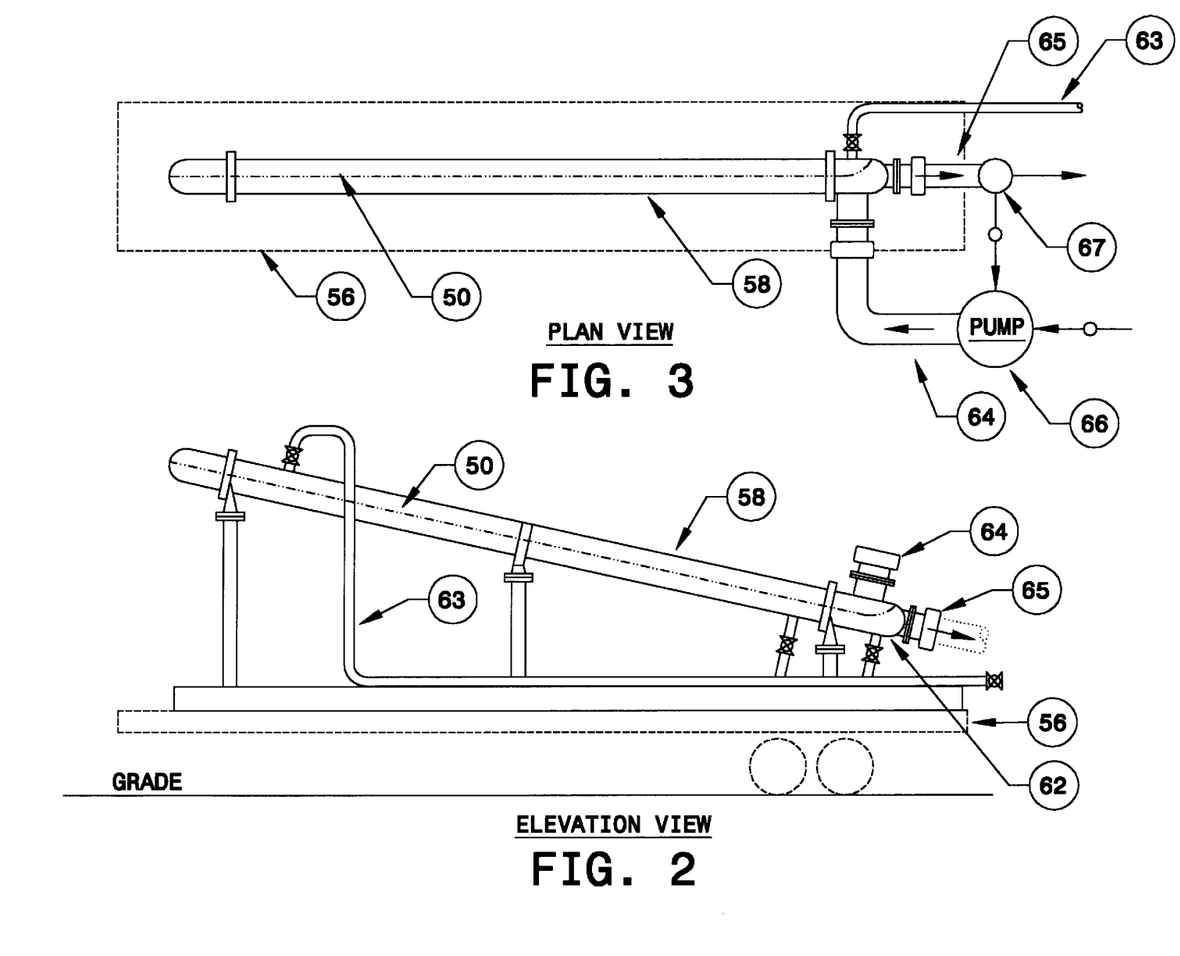
FIG. 2 is a side view of a membrane separator having the form of an elongate bundle of pipes in a collection sleeve mounted on a trailer.
FIG. 3 is a top view of the truck mounted equipment shown in FIG. 2 showing connections for that equipment.

Directing attention now to FIG. 2 of the drawings, the membrane separator 50 is shown for mobile application where it is mounted on a trailer 56 which is towed to a field location and then left. A fixed plant can omit the trailer and can be mounted on a skid or foundation. The membrane separator comprises a plurality of U-shaped tubes in a surrounding housing or jacket. The jacket captures the clarified discharged solvent. For a better understanding of this, attention is diverted momentarily to FIG. 4 of the drawings. There, the jacket 58 is shown enclosing a U-shaped membrane tube 60. The jacket connects to a header plate 62 at one end and a comparable header 64 at the opposite end. The membrane tube 60 connects with a U-shaped bend 66 at the remote end. The bend 66 is typically made of a nonporous metal such as stainless steel, a chemically inert metal not impacted by any fluid flowing through the system. The headers 62 and 64 are included to align a nest of tubes. All the tubes in the nest are made of porous membrane material. There may be several hundred linear segments inside the jacket 58 that serves as a collection vessel. In the collection vessel, the filtrate which is clarified by the membrane flows through the wall. It is permitted to drip or flow out through the openings 52 at spaced locations. In very general terms, the CsF laden fluid is pumped into the U-shaped tube 60 and flows along the tube. The length of the tube is materially shortened by folding it into the two illustrated parts. As will be understood, and through the use of appropriate bends 66 at both of the headers, a serpentine flow path of 2, 4, 6 or more segments is constructed. Assume for example that the feed flows through 20 membrane tubes segments. In this flow path, the flowing solvent has the opportunity to pass through the wall of the membrane tube. It drips downwardly and flows out through the drain 52 in the jacket. The jacket 58 is thus formed of a non-permeable material, and is provided with multiple drain ports or openings 52 to remove the discharged filtrate.

Figure 5:
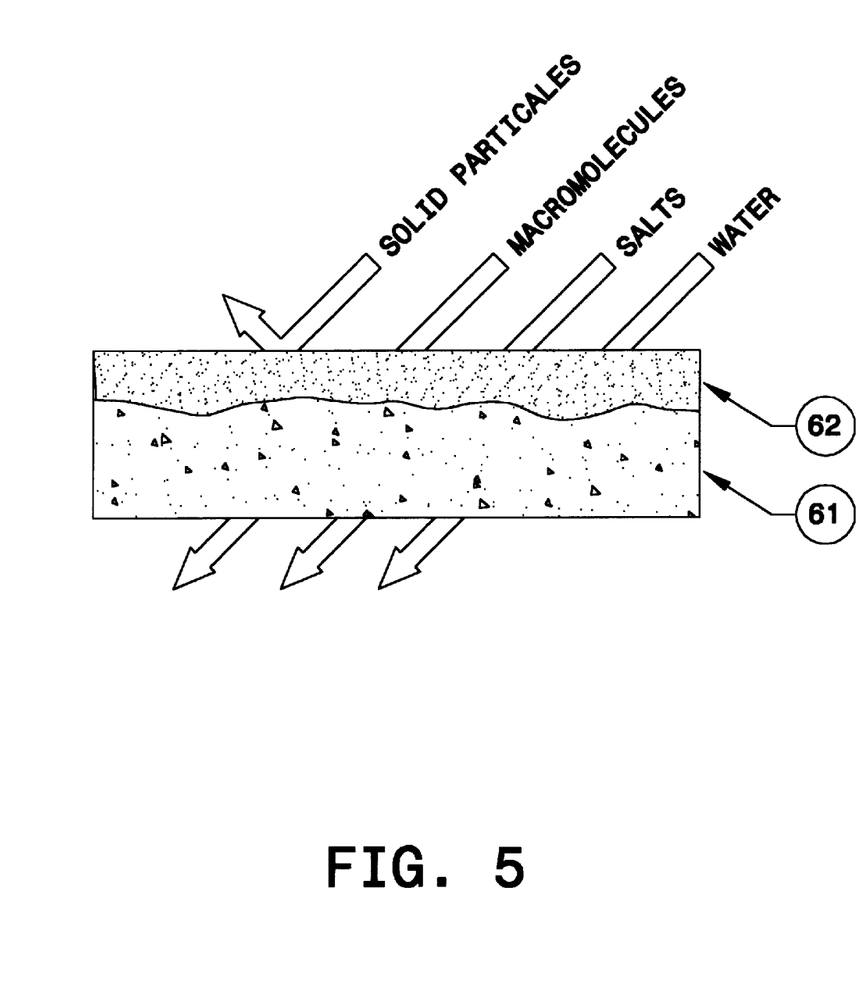
FIG. 5 is a sectional view through the wall of the membrane showing how the membrane segregates the solvent from the particles in the solvent.

The membrane which defines the tube 60 is specially constructed. In general terms, it is made with two layers. The wall is made from stainless steel particles which were packed to a particular shape and then joined together by sintering. When sintered, this forms a porous membrane. The pores in the membrane have a specified median diameter. The interior surface is smoothed somewhat by placing a second coating over it. Going to FIG. 5 of the drawings, the sintered stainless steel particles 61 comprise the greater portion of the wall thickness. A thin layer of $TiO_2$ powder is placed on the inside surface and likewise sintered to form the layer 62. It provides a more smooth surface and defines the typical or average pore diameter. In this particular instance, the pore diameter for this embodiment is about 0.1 micron. This provides a porous barrier which is able to pass solvent molecules. Solid particles in the CsF liquor are not passed. Large molecules are passed or rejected depending on the size of the molecules. The solvent passes readily through the membrane, the solvent typically being water. Salts dissolved in the solvent typically will also pass through the membrane dependent on size. As it flows through, water removal leaves a more and more strong concentration of the particles which remain after the solvent removal. This will be defined as the membrane concentrate. In effect, it includes solids that remain in the flow.

Coming back now to FIG. 2 of the drawings, it will be observed that the jacket 58 is inclined at an angle. It is equipped with a collection line 63 which is connected to one or more drain points along the jacket 58. By appropriate connection, an input line 64 is provided for the system. It connects to the end located manifold 62. The manifold 62 also houses the connections for the outlet line 65. The input is delivered into the manifold so that flow is directed into numerous U-shaped membrane tubes exemplified in FIG. 4. They are serially or parallel connected as needed in the jacket 58. The cross sectional flow path for the inlet line 64 is approximately matched by the aggregate cross sectional flow path of the membrane tubes 60. In other words, it is not necessary to restrict flow with the membrane tube 60. Indeed, relatively smooth laminar flow through the membrane tube 60 is generally desirable.

Pressure drop across the membrane tube is relatively stable during use. It is desirable that the flow rate be kept to some specified velocity range. A change in flow rate changes the manner in which the concentrate tends to blind the membrane. The membrane is collectively an elongate filter surface. It is a filter surface which runs the risk of blinding. Preferably, the concentrate is pumped at a specified minimum velocity, and even greater velocities are achieved. This suggests a flow velocity at least above about 14 feet per second velocity along the membrane tube. If insufficient filtration is accomplished, then the tube 60 is simply made longer. That can be done by arranging more tubes in series. As exemplified in FIG. 4, there are two tubes in series. This can be extended to 4, 6, 8 and so on. By arranging the tubes in that fashion, the number of passes through the membrane tubes is increased so that the optimum amount of solvent is retrieved from the concentrate. Moreover the flowing concentrate is kept at a adequate velocity to assure that the concentrate does not settle against the wall or the tube 60 and thereby blind the tube.

Going now to FIG. 3 of the drawings, the external jacket 58 is again shown. The inlet line 64 is also shown in conjunction with a pump 66. The pump 66 assures that there is an adequate velocity through the membrane tube 60. The outlet line 65 is input to a valve 67. Some portion of the concentrate is controllably returned to the inlet line 64. This enables continuous recycling of the concentrate stream so that appropriate filtering is carried out. The valve 67 divides the outlet, thereby providing a discharge at one branch and a portion for feedback at the other branch.

Representative operating parameters include the velocity, pressure and temperature of the fluid system undergoing treatment. The flow velocity is typically kept between about 14 and 16 feet per second in the membrane tube 60. The temperature is typically set between 180° F. and 200° F. The input pressure to the membrane tube is in the range of about 150 to 250 psi. Where the solvent is water, the set points are adjusted and the velocity is typically in the range of about 14 to 17 feet per second, the temperature is between about 140 and 180 degrees, and the pressure input to the membrane tube 60 is about 200 psi. In all instances, the input pressure is kept sufficiently high and the velocity is also kept sufficiently high that the concentrate stream discharge rate is relatively high, i.e., a drop in flow velocity is generally avoided.

CENTRIFUGE EXTRACTION

The related apparatus utilizes two (2) centrifuges as described immediately following. As presented in FIG. 1 of the drawings, centrifuge 26 is a decanting centrifuge designed for continuous sedimentation of suspended solids from a liquid by the effect of centrifugal force in a horizontal elongated bowl. An axial screw conveyor within the bowl continually removes the solids. The gravitational force created can reach 3,000 times normal gravity. The decanting centrifuge 26 is designed to remove the heavier solids. Centrifuge 36 is a disc centrifuge that is designed to incorporate a high speed vertical rotating bowl containing a series of discs that are designed to both markedly reduce the settling distance and increase the clarification area. The gravitational force created can reach 6,000 times normal gravity. The disc centrifuge 36 performs the removal of the solids not removed by the decanting centrifuge 26. In the case of each centrifuge, the certain solids react to the gravitational forces and settle to the bottom and are discharged. The discharged solids are of a significantly dry status. While not dry completely, they form a relatively dry slurry which is significantly free of water. To be sure, some water with CsF is bound in the discharged solid particles.

To summarize, and referring to FIG. 1 of the drawings, the system 10 segregates components where the gradation between water and heavier particles can be adjusted. Some water is disposed of with the heavy particles to form a slurry. Coming back to FIG. 1 of the drawings, flow in the system is thus controlled in the following manner. A CPU 70 is included for operation of one or several valve operators 72. The CPU is used to control the operation of the system. First, each of the tanks is provided with a level controller 74, These duplicate controllers enable measurement of the volume of the tanks. By appropriate measurement of the fluid level and by using the CPU 70 to control both the fluid level and amount of heat (steam) delivered to the tanks, the flow output is carefully monitored and controlled in both volume and temperature. This can be used to operate all of the output pumps.

Proper operation of the equipment shown in FIG. 1 is enhanced by installing flow meters 76 at respective illustrated locations. The flow meters control operation because they measure the flows and indirectly control the system pressure. The pumps are operated to achieve the set point pressures. The membrane separator 50 operates with a selected input pressure. The flow meters 76 are located in the system to assure system control. Likewise, a thermostat 78 is connected to each of the tanks. This can be duplicated in other locations. All the sensors 74, 76 and 78 connect to the CPU to assure input of data sufficient to make the necessary measurements and output needed control signals.

The outlets of the system 10 shown in FIG. 1 are controlled by a number of valves. There are valves 80 at various locations. In general terms, the valves 80 are opened or closed. It is possible to install and operate valves that are modulated. However, that makes the controller somewhat more complicated. Control is generally implemented by control of the pump speeds. The pumps 22, 32, and 42 are thus operated at appropriate adjustable speeds to obtain the desired pressure ratings at various locations in the system. These pump speeds are carefully selected so that the appropriate pressures downstream are obtained. The valves 80 are adjusted to switch different operational aspects. The line 18 is the feed line while the line 48 is the feedback line. The line 48 is selectively connected so that the feedback is delivered to the tank 20, 30, or 40.

The valve 82 however is an adjustable valve. It selects the proportion of feedback which is input to the disc centrifuge. This assures that the centrifuge is not flooded. When flooding occurs, an excess of liquid is observed in the feedback line 48.

SOLIDS WASH TANK

The two centrifuges reject solids in the line 28 and 38 input to the wash tank 100. While the solids sometimes can be relatively free of the expensive cesium formate, assume that such cuttings are wet with cesium formate in solution. The solids flow into the wash tank 100 which is provided with wash water at some elevated temperature. The solids are delivered through the line 28 and 38 to the tank 100. That is the source of fluid into the tank. The tank is provided with a flow of water. Roughly, the lines 28 and 38 deliver some water on the solid particles that are delivered into the tank. The particles are not dried; rather, they are delivered in a solids laden slurry which is primarily the solid particles themselves (clays, starch, polymers, and the like) and these particles carry an adhesive film of water (serving as a solvent) including the cesium formate. This is a liquid layer which adheres to the particles and causes the particles to form into the slurry. Roughly, about two units of water are added for every volume unit of slurry. This is sufficient to reduce the density and reduce the adhesive adherence of the CsF in solution to the particles. The tank contents are agitated by delivering the water under some pressure into the tank and with further agitation utilizing conventional mud mixers. This permits the solids to settle to the bottom and the cesium formate and water can be pumped back to tank 20 or tank 30 for system recycle. At calculated occasions, the solids are drained from the wash tank 100. The water that is admitted is recaptured where it flows from the tank and is recycled. This wash water carries out a portion of the CsF (recovery rates will be discussed below) so that the flow of solid particles is continuously treated. Accordingly, the wash tank 100 will periodically accumulate an excess of particles on the bottom, and they are periodically discharged from the bottom of the wash tank.

The wash water which is input to the tank 100 is obtained from either an outside source or from the outlet line 46 from the membrane separator 50. Briefly, the separator 50 forms two streams, one of which is the solids stream, a flow of relatively dewatered solids in the pipe 48 which is the feedback loop. The solvent which passes through the wall of the membrane 50 is output through the line 46. This is primarily water. It is water because the size of the pores defining the membrane limits the flow. Therefore, the flow in the line 46 is completely free of solid particles because they will not pass through the pores, and carries the solution of the CsF. CsF is also in the solid stream which flows back in the feedback pathway 48. The water in the line 46 is output to the line 46 and is delivered through a valve 86 and input to an evaporator 88. The evaporator dries some water and discharges a flow of heated water, i.e. steam to a condenser 90. The condenser 90 drops the temperature somewhat, converting the vapor to liquid, and that is input as the water flow for the wash tank 100. Overflow from the tank 100 is delivered out through the pump 92. That returns the water back to the evaporator which flows in a constant cycle.

There is a second important aspect to operation of this system. It is determining the advisability of inputting the feed to the tank 20 or the tank 30. This selects the first stage for operation of the feedback loop that is involved. Once the system is connected in a feedback mode by delivering through the input line and recycling a significant portion of the feed, that being done through the feedback line 48, the system then operates in a continuous fashion. Set points are appropriately implemented under computer control. The set points thereby determine the degree of separation and the amount of recycling that occurs through the feedback system. In effect, liquid is obtained from the liquid outlet 46 which is primarily water, not CsF in solution, and the washed waste solids are free of CsF.

Attention is now directed to a representative situation to show the difference in the outputs of the membrane separator 50 as well the disc centrifuge 36. Assume that the feed is mixed CsF drilling fluid and comprises a mix of hot water (perhaps 175° F.), dissolved CsF compounds which have entered into solution, particles in suspensions, medium and even larger pieces held in suspension, some having substantial hydrate complexes, and larger particles which are chips of sand or shale. Suffice it to say, the CsF is mixed with water at elevated temperature and may hold a substantial portion of water as a hydrate in the solution subsequently cleaned by this process. After the processing has continued for an interval, the CsF liquor is recirculated by the line 48 in the system. Important aspects of the operation include the segregation of the extracted solids (cuttings) significantly free of the CsF. The discharge is a stream of moist particulate material, perhaps more in the form of a slurry which includes the heavier components. By appropriate and careful adjustment of the set points for operation of the system, a significant portion of solids can be extracted wherein the solid products form a slurry mass of a semi-solid consistency. It has little value. The slurry is ready to be thrown away and has trivial value, and is more or less easily disposed of without substantial sewage cost. The slurry mass which is discharged has little value. A number of benefits will be noted below on review of the extraction apparatus considered in greater detail.

RECOVERY RATE FOR THE DIFFERENT STAGES

In the instance where a cesium formate well fluid system is used, a great portion of it is lost to the drilling process. It is not easy to clean up this fluid. The present disclosure sets forth a very effective recovery scheme. Merely treating the CsF drilling fluid with individual stages of centrifugal separation or membrane separation usually will not recover enough of the CsF. Likewise, processing the CsF spent fluid through a wash tank is usually inadequate. The present disclosure sets forth a method and apparatus for accomplishing this successfully with a high rate of recovery. Consider as an example the sequential processing of the drilling fluid through a centrifugal separator and then a membrane separator. It is possible to recover well more than half, and perhaps 65% to about 70% of this CsF. The loss, however, is excessive. Even by adding the feedback loop, the rate of recovery, while good, is not high enough. The present disclosure contemplates the enhancement of both types of separation with the feedback loop, thereby improving the rate of recovery to perhaps 75% to 80%. Again, this is variable and it depends significantly on the nature of the debris recovered in the well drilling process. By incorporating the separation of the solids and processing them through the wash tank 100 as mentioned above, the separation becomes significantly better. The recovery is therefore much better, and the system set forth in FIG. 1 can recover as much as about 92% to about 98% of the CsF. Moreover, the output of the system is a stream of particles, cuttings, solids and other trash picked up in the fluid. The recovered component is the water soluble CsF in solution. By adjustment of the evaporator 88 residence time and temperature, the amount of water driven off can be varied and that enables control of the weight of fluid recovered. For instance, it is possible to reduce the amount of water, and thereby increase the relative weight. The cleaned and processed output stream can be raised back to a high level, perhaps in the range of 17 to 19 pounds per gallon. Again, this depends on the amount of utilities that are involved in the heating of the water to thereby increase the relative ratio of CsF to solvent.

AN ALTERNATIVE EMBODIMENT

Figure 6:
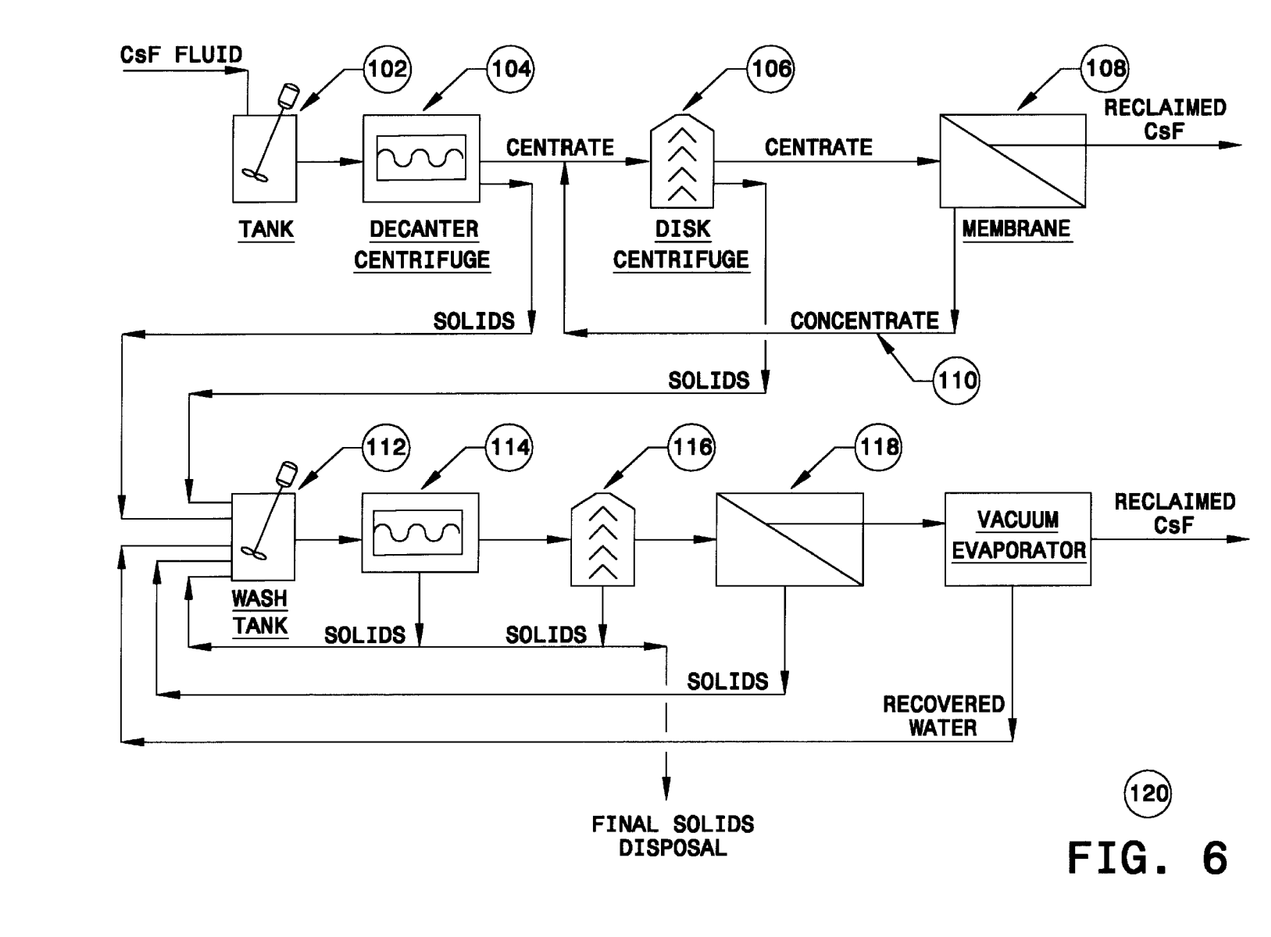
FIG. 6 is an alternate multiple stage centrifuge operative with a membrane separator showing a different feedback loop.

FIG. 6 shows a CsF stream which is input to the system 120. As before, this system incorporates an input tank 102, a decanter centrifuge 104 and a disc centrifuge 106. These are output to a membrane separator 108. There is a feedback pathway 110 which enables the output of the CsF fluid. In this particular instance, and without any further assistance, the output ratio again will be at least about 65%, and can be as high as about 70% or even 75%. The system illustrated in the top part of FIG. 6 can be precisely the same equipment shown in FIG. 1; FIG. 6 assists in an understanding in large part because it omits the complexities of tanks and pumps, control valves, and the like; it simply shows the pathway of the fluid flow through the three stages of separation and incorporates the feedback loop 110 consistent with the construction of the system 10, see FIG. 1.

The solids from the first and second centrifuges are discharged to the wash tank 112. In addition, it incorporates the centrifuge separators 114 and 116 along with a membrane separator 118. These are shown in FIG. 6 as a separate line of equipment. While they can be, and it is possible to use significantly smaller equipment for the components 114, 116, and 118, it is just as possible and indeed more efficient in terms of equipment usage to simply combine the second processing line shown in FIG. 6 (at the bottom of the view) with the processing line at the top of the view. Accordingly, the output of the wash tank 112 can simply be input to the decanter centrifuge 114. This deployment, however, is tutorial to show how reiterative processing assists in recovery. Therefore, focusing on FIG. 6 as actually illustrated, the fluid flow through the bottom components primarily includes wash water which is added to the cuttings, and illustrates how the cuttings are then removed and disposed of by the first and second centrifuges. These take out a stream of cuttings which are thrown away. The solvent is processed to the membrane separator 118. Its output is a stream of solids which are recycled back into the wash tank by a feedback line, and the output of the membrane separator 118 is a solvent stream which is output to the vacuum evaporator. That carries the CsF molecules in it in solution. A portion of it is driven off as steam, and that steam is then recovered as water and recycled back to the wash tank. The output of the system 120 shown in FIG. 6 is a much-enhanced recovery. Rather than being perhaps 65% and even as much as 70%–75% using the top processing line only, the enhancement with the wash tank jumps the recovery substantially. It enables recovery of about 92% or more of the CsF. Therefore, as illustrated, the system 120 provides a remarkable enhanced recovery rate.

In one aspect, the present disclosure at FIG. 6, while greatly simplified, illustrates a highly effective system which is able to recover most of the CsF to thereby enable subsequent reuse in drilling the next well. Makeup fluid is not so expensive for the second and following drilling programs. The makeup fluid (to replace that which was lost) is significantly less and it is therefore much more economical to use the CsF fluid system in drilling a large number of wells.

One important aspect to the present disclosure is the relative ease of adjustment of the set points at which separation is accomplished. In general terms, this is accomplished for each of the two centrifuges and the membrane. Nevertheless, the set points for separation are coordinated so that excessive dwell time is not required in any of the three. It is especially important to adjust this so that the throughput of each match the others so that no one stage becomes a bottleneck in the operation. All the while, the system is operated as a system so that the three particular separation stages are integrated. To this end, FIG. 1 includes the many valves provided with valve operators. The CPU 70 provides control signals to the several valve operators which are connected to the valves. In the particular embodiment shown in FIG. 6, valves are installed (but not illustrated) which operate in the same fashion. While they may differ in the setpoints applied to the individual valves, they all operate in the same fashion by signals provided to the valve operators. In all embodiments, each valve is provided with its own operator. The CPU 70 forms the appropriate set signals for the several valve operators. This enables the system to adjust each valve operator so that the flow through the system is appropriate. Appropriate sensors are located in the system as noted. Typically, the responsive sensors have inputs to the CPU 70. FIG. 6 thus includes the valuable feedback loop and the solids wash tank (one or more) just as taught for FIG. 1.

In FIG. 1, the feedback path 48 is one feedback path. In FIG. 1, the feedback line 48 is switched by valve control to return some portion to the tanks. In similar but modified fashion, the line 48 connects to deliver feedback flow to either of the tanks 20, 30, or 40. The centrifuge stage(s) modify the feedback flow, and the several tank(s) define more places to deliver the feedback flow. Therefore, one, two or even three feedback terminations can be added or arranged in FIG. 6, and flow in the lines 46 and 48 can be controlled. With feedback to any tank, the system 10 can operate continuously; an alternate mode of use is with a batch approach using the tank 14 to store a large initial volume which is pumped out completely to process a fixed batch.

IMPACT OF MEMBRANE LENGTH ON PURIFICATION

Figure 4:
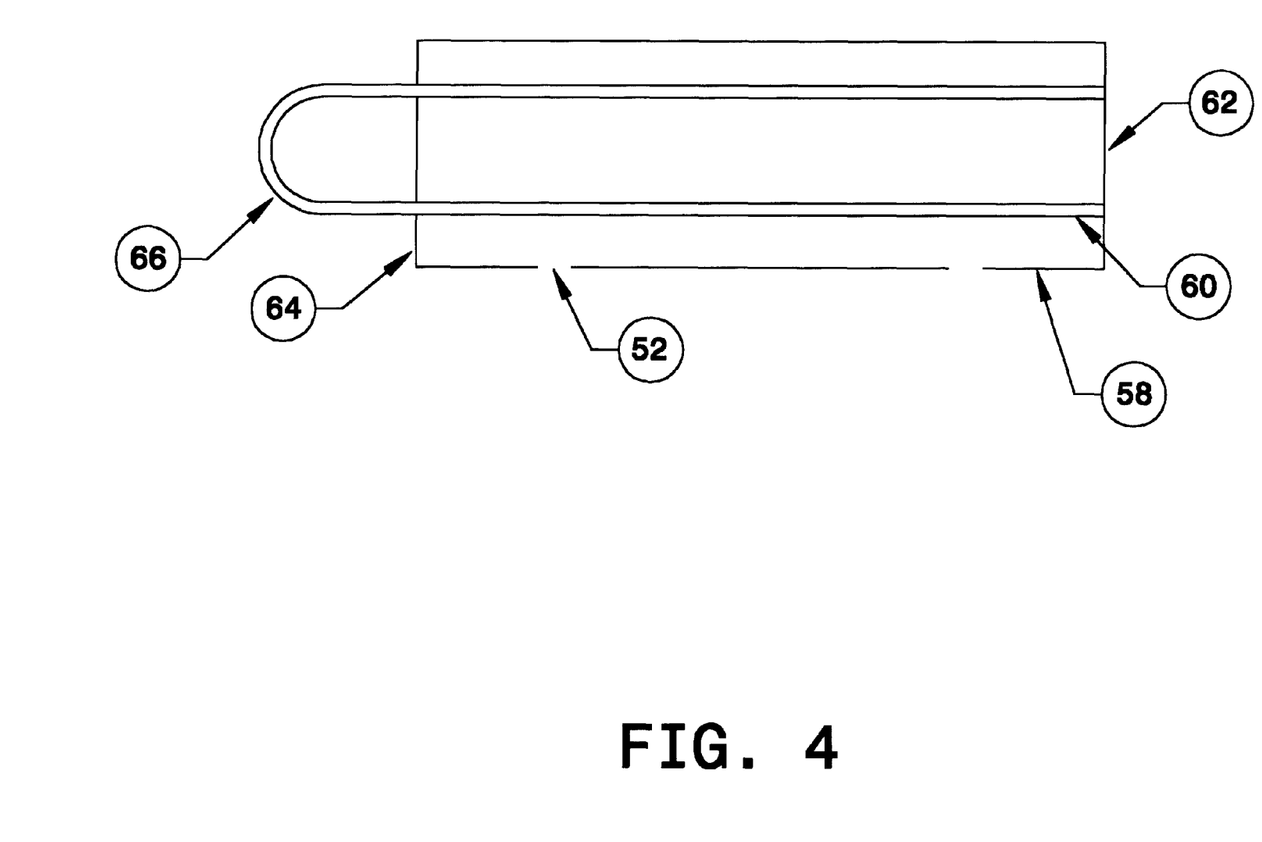
FIG. 4 is a simplified view of a single membrane pipe in the apparatus shown in FIG. 2.

The present disclosure utilizes the membrane which has the form of the folded tube shown in FIG. 4. Briefly, the U-shaped tube 60 is folded any number of times for directing the stream through a series of the tubes. Since the tubes making up the membrane 60 come in a fixed and finite length, the total length is achieved simply by serially connecting the tubes together. As shown in FIG. 3 of the drawings, both input and output to the membrane tubes 60 are at the right hand end. A single pass of the waste stream is achieved on flow to the left and a second pass occurs with return back to the right hand end, just as shown in FIG. 4. If the tube 60 is 40 feet in length (approximately the maximum length suitable for the towed trailer), then the flow path for the tube shown in FIG. 4 is 80 feet (again assuming that the bend 66 is not porous). By forcing another trip through another U-shaped tube, the total length is increased is to 160 feet and even numbered multiples of 40 feet. This defines a series wherein N is an even numbered integer and is 2, 4, 6, 8 . . .

The CsF stream flows through the first and second centrifuges. The last cut is achieved in the membrane system 50. The cut, however, from the membrane 50 is improved or enhanced by extending the length of the membrane. Using the above stated formula, if the membrane tube is 480 feet, or perhaps 640 feet, then the amount of solvent pulled from the CsF stream is increased and a greater level of dewatering is obtained. Interestingly, if feedback occurs at that juncture, the length of the membrane tube can be decreased and yet the amount of solids removed by the centrifuges is increased. This feedback line 48 operates in conjunction with the two tanks. The feedback line is directed from the output of the membrane separator 50 to return the feedback to one. This feedback directs the flow out of the membrane separator 50 to the storage tank 30. Consider for the moment that 75% of the material output in the CsF stream from the membrane separator is switched back through the feedback line. If that occurs, the gross output is actually reduced and the amount of output from the centrifuge 36 is increased.

By judicious adjustment of the feedback ratio coupled with increasing (or decreased) length of the membrane tube in the separator 50, the proportion of the material removed by the second centrifuge is increased. While the portion removed by the membrane separator 50 is decreased. The feedback cycle just described enhances the removal accomplished at the second centrifuge. Moreover, earlier removal of waste prior to arriving at the membrane thereby reduces the total throughput of the membrane separator and reduces the utilities for operation. In effect, this connection with feedback enhances significantly production of the entire system at a lower cost.

As tube length is increased, greater length increases the relative portion of the waste that is segregated from the solvent by the membrane tube. With the feedback, however, the modest elongation of the membrane tube cooperates to make the centrifuge 36 more effective, thereby removing more of the waste at that stage, and producing a relatively clarified stream for the membrane separator 50. The feedback cycle will stabilize at appropriate flow rates and discharge rates for the second centrifuge and additionally for the membrane separator. In general terms, more CsF fluid is delivered from the second centrifuge, thereby providing the membrane tube with a larger relative solvent flow in the remaining stream to assure that the flow velocity is maintained within the specified velocity limits.

The major material which is selectively removed includes formation particles (sand, shale and the like). These materials are characterized in that they do not easily come out merely by centrifuging; rather, they need to be dewatered at least somewhat in the membrane separator 50. The cesium formate molecules become more cohesive after passing through the membrane separator 50 and are then more readily removed in the second centrifuge 36.

MEMBRANE PORE SIZE

An important aspect of the present disclosure is matching the pore size of the membrane to the size of the molecules which make up the solvent. Generally speaking the pore size should be arranged so that the solvent molecules pass through readily. With pores of about one micron down to 0.1 micron, the molecules of water, diesel oil and synthetic oil pass readily through the membrane separator. In most instances, small molecules of salt in the solvent were also passed through. The pore size however excludes the heavier particles.

While the foregoing is directed to preferred embodiment, the scope thereof is determined by the claims which follow:

What is claimed is:

1. A method of separating particles, cuttings and debris from the solvent in the cesium formate drilling fluid stream carrying particles in the solvent that requires no separation enhancing chemical processing, wherein the method comprises:

(a) inputting the drilling fluid stream to the membrane separator at the controlled temperature and pressure and flow rate, wherein
  (i) said membrane separator comprises the first membrane layer of sintered first material and the second membrane layer of sintered second material attached to said first membrane layer, and
  (ii) said drilling fluid stream impinges first upon said first membrane layer;
(b) fabricating said sintered first material and said second material with the pore size so that the filtrate including solvent can pass therethrough thereby removing and separating said filtrate and said solvent passing through the membrane separator from the drilling stream;
(c) fabricating said sintered first material with the pore size so that the concentrate cannot pass through said first membrane layer thereby removing the concentrate from the drilling fluid stream;
(d) passing the concentrate through a preliminary centrifugal separator and the to the membrane separator connected thereto by a feedback loop;
(e) recovering solids from a flow of the concentrate not passing through the membrane separator by directing the concentrate into the wash tank and washing the concentrate with water to thereby remove cesium formate in the water solution.

2. The method of claim 1 comprising a step of recycling water into the wash tank to remove residual cesium formate on the cuttings in the wash tank.

3. A method of separating particles, cuttings and debris from the solvent in a cesium formate drilling fluid stream carrying particles in the solvent that requires no separation enhancing chemical processing, wherein the method comprises:
  (a) directing the drilling fluid stream through the centrifugal separator, and thereafter directing the flow for input to the membrane separator;
  (b) inputting the drilling fluid stream to the membrane separator at the controlled temperature and pressure and flow rate, wherein
    (i) said membrane separator comprises the first membrane layer of sintered first material and the second membrane layer of sintered second material attached to said first membrane layer, and
    (ii) said drilling fluid stream impinges first upon said first membrane layer;
  (c) fabricating said sintered first material and said second material with the pore size so that the filtrate including solvent can pass therethrough thereby removing and separating said filtrate and said solvent passing through the membrane separator from the drilling stream;
  (d) fabricating said sintered first material with the pore size so that the concentrate can not pass through said first membrane layer thereby removing the concentrate from the drilling fluid stream;
  (e) passing the concentrate through the preliminary centrifugal separator and the to the membrane separator connected thereto by a feedback loop; and
  (f) directing the portion of the drilling fluid stream into a wash tank for washing with water wherein the water as a solvent removes cesium formate in solution.

4. A method of separating particles, cuttings and debris from a solvent in a cesium formate drilling fluid stream carrying particles in the solvent that requires no separation enhancing chemical processing, wherein the method comprises:
  (a) directing the drilling fluid stream through a centrifugal separator, and thereafter directing the flow for input to a membrane separator;
  (b) inputting the drilling fluid stream to the membrane separator at a controlled temperature and pressure and flow rate, wherein
    (i) said membrane separator comprises a first membrane layer of sintered first material and a second membrane layer of sintered second material attached to said first membrane layer, and
    (ii) said drilling fluid stream impinges first upon said first membrane layer;
  (c) directing the flow in the membrane separator along a path comprising first and second legs wherein said legs are parallel, thereby enabling the solvent to pass through the first and second legs of said separator and including an added step of collecting the solvent for flow in a common line;
  (d) fabricating said sintered first material and said second material with a pore size so that a filtrate including solvent can pass therethrough thereby removing and separating said filtrate and said solvent passing through the membrane separator from the drilling stream;
  (e) fabricating said sintered first material with the pore size so that a concentrate cannot pass through said first membrane layer thereby removing the concentrate from the drilling fluid stream;
  (f) passing the concentrate through the centrifugal separator and then to the membrane separator connected thereto by a feedback loop; and
  (g) directing a portion of the drilling fluid stream into a wash tank for washing with water wherein the water as a solvent removes cesium formate in solution.

* * * * *